Figure 1:
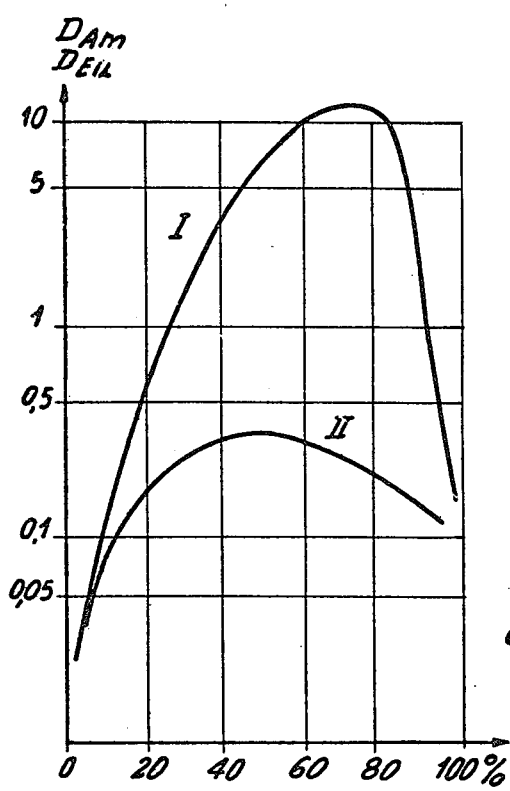

United States Patent [19]

Fitoussi et al.

[11] Patent Number: 4,461,747
[45] Date of Patent: Jul. 24, 1984

[54] METHOD FOR SEPARATING ACTINIDES FROM LANTHANIDES IN AN ACIDIC AQUEOUS SOLUTION

[75] Inventors: Richard Fitoussi, Paris; Claude Musikas, Bures sur Yvette; Hubert Ranarivelo, Paris, all of France

[73] Assignee: Commissariat a l'Energie Atomique, Paris, France

[21] Appl. No.: 339,077

[22] Filed: Jan. 13, 1982

[51] Int. Cl.³ .............. C01G 56/00; C01G 57/00; C22B 60/02
[52] U.S. Cl. .................. 423/10; 423/2; 423/8
[58] Field of Search .................. 423/10, 20, 8, 2

[56] References Cited

U.S. PATENT DOCUMENTS 2,905,525  9/1959  Dawson .................. 423/18 X
4,226,791 10/1980  Reinhardt et al. ........ 423/658.5 X
4,339,416  7/1982  Fitoussi et al. ......... 423/10

OTHER PUBLICATIONS

Curtui, M., et al., "Solvent Extraction of Dioxouranium (VI) with Dialkylphorodithioic Acids-VI Synergic Effect of Triphenylphosphine Oxide", J. Inorg. Nucl. Chem., v. 43, pp. 1076–1078, 1981.

Primary Examiner—Benjamin R. Padgett
Assistant Examiner—Matthew A. Thexton
Attorney, Agent, or Firm—Kerkam, Stowell, Kondracki & Clarke

[57] ABSTRACT

A method for the separation of actinides from lanthanides present in a trivalent state in an acidic aqueous solution.

Said method consists in selectively extracting in an organic solvent the actinides present in said solution, by bringing said aqueous solution into contact with an organic solvent comprising a system of extractants constituted by an acidic organo-phosphorated compound containing at least one electron doner sulfur atom such as di-2-ethylhexyl-dithio-phosphoric acid, and by a neutral organophosphorated compound containing at least one electron-doner oxygen atom such as tributyl phosphate.

5 Claims, 4 Drawing Figures

METHOD FOR SEPARATING ACTINIDES FROM LANTHANIDES IN AN ACIDIC AQUEOUS SOLUTION

The present invention relates to a method for separating actinides from lanthanides present in a trivalent state in an acidic aqueous solution, to be used in particular for the treatment of radioactive effluents.

In the nuclear industry, in particular as regards the treatment of aqueous effluents containing lanthanides and actinides such as transuranians, it is most advisable to separate actinides from lanthanides before conditioning these radioactive waste for the long storage thereof, e.g. through vitrification.

It is well known, indeed, that lanthanides being $\beta$ and $\gamma$ emitter fission products have half-lives much shorter than that of actinides, the latter being $\alpha$-emitter elements. Accordingly, it is preferable to condition waste containing emitters with a short half-life exclusively, the latter becoming inert more rapidly, which removes many difficulties as regards their long-term storage.

Moreover, the recovery of actinides is quite advantageous since the latter can be used in various fields, e.g. for generating radioactive sources. That is why it is quite advantageous to separate actinides from lanthanides in order to recover actinides, on the one hand, and so as to treat, for their long-term storage, fission products with a short half-life exclusively, the latter being less harmful, on the other hand.

Such a method can find applications in the production of transuranians through neutronic irradiation for targets of lighter isotopes, e.g. in the production of americium 241 and curium 244 issued from irradiated plutonium.

However, the problem of separating actinides from lanthanides is hard to solve, since lanthanide ions (III) and actinide ions (III) have very similar chemical properties, their ionic radiations have similar sizes and most of the complexes obtained from lanthanides or actinides have a strongly marked ionic character.

The method for the separation of actinides from lanthanides carried out to this day have many drawbacks, because they make it necessary to resort to concentrated saline mediums, e.g. 10M solutions of LiCl, or to relatively high pH's, which leads to difficulties as regards carrying out said methods.

The present invention precisely aims at providing a method for the separation of actinides from lanthanides present in a trivalent state in an aqueous solution. That method obviates the above-mentioned drawbacks, and, in addition, permits to obtain a quantitative separation of actinides from lanthanides.

More specifically, the object of the present invention is to provide a method for the separation of actinides from lanthanides present in a trivalent state in an acidic aqueous solution, characterized in that it consists in selectively extracting in an organic solvent the actinides present in said solution, by bringing said aqueous solution into contact with an organic solvent comprising a system of extractants constituted by an acidic organo-phosphorated compound containing at least one electron doner sulfur atom and by a neutral organo-phosphorated compound containing at least one electron-doner oxygen atom.

In view of the use of the above-mentioned system of extractants, the method according to the present invention has, in particular, the advantage of leading to a satisfactory separation of actinides from lanthanides, without however requiring the addition of salts or other reactants to the starting aqueous solution, the latter being generally a nitric solution.

According to the present invention, said acidic organo-phosphorated compound is preferably a dialkyl dithiophosphoric acid, such as e.g., di-(2-ethyl-hexyl)-dithiophosphoric acid, dibutyl-dithiophosphoric acid and di octyl dithiophosphoric acid.

It is preferred to use di-2-ethyl-hexyl-dithiophosphoric acid (HDEHDTP).

According to the present invention, the neutral organo-phosphorated compound with an electron-doner oxygen atom can be a phosphate, a phosphonate, a trialkyl phosphinate, a phosphine oxide in which the alkyl radicals are straight or branched radicals in $C_4$ to $C_{12}$, e.g., tributyl phosphate (TBP), said oxygenated doners having the formula:

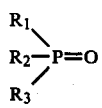

in which radicals $R_1$, $R_2$ and $R_3$, either identical or different, designate an alkyl, an alkoxyalkyl or an aryl radical.

Preferably, radicals $R_1$, $R_2$ and $R_3$ are alkyl or alcoxyalkyl radicals with from 4 to 12 carbon atoms.

By way of example, a suitable phosphine oxide would be trioctyl phosphine oxide or di-n-hexyl-octyloxymethyl-phosphine oxide.

For carrying out the method according to the present invention, it is a common practice to dilute the system of extractants in an inert solvent such as dodecane.

Preferably, the concentration of each of the extractants in the organic solvent is such that the molar ratio of the acidic organo-phosphorated compound with at least one electron-doner sulfur atom to the neutral organo-phosphorated compound with at least one electron-doner oxygen atom be from about ⅔ to 9/1.

It is to be noted that the method according to the present invention can be carried out in any conventional extraction apparator, such as batteries of decanter-mixers, pulsed columns, centrifugal extractors.

Figure 2:
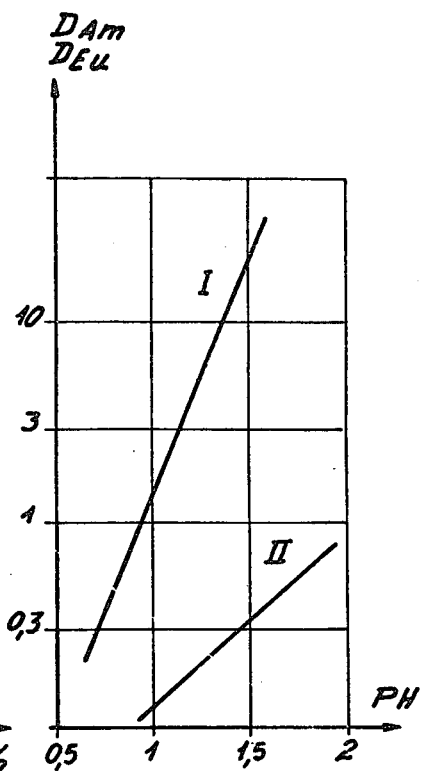
Figure 3:
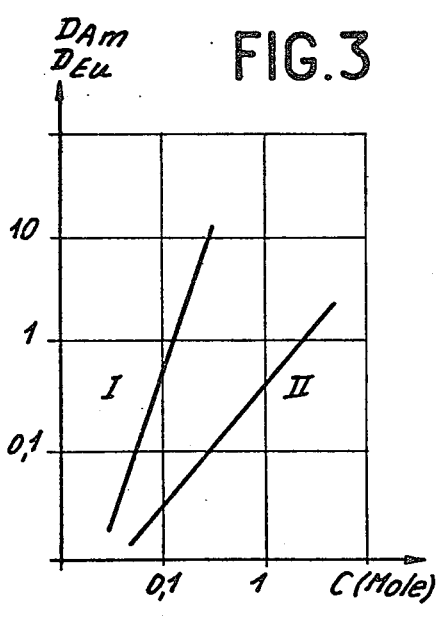
Figure 4:
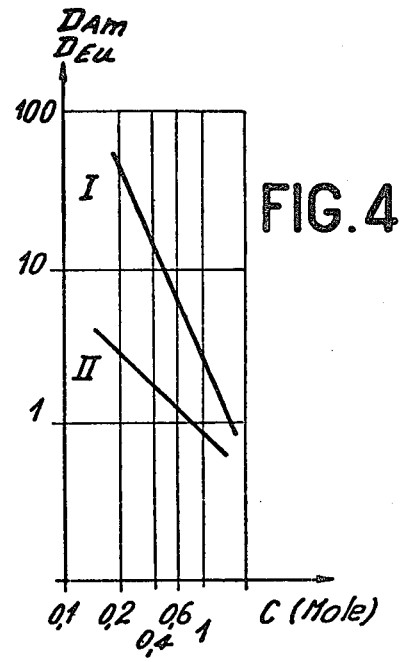

Other features and advantages of the present invention will appear more clearly from the following non limiting examples with reference to the following drawing, in which FIG. 1 is a diagram depicting the variations of the distribution coefficients $D_{Am}$ of americium and $D_{Eu}$ of europium (curves I and II, respectively), with respect to the concentration of the organic solvent in tributyl phosphate and di-(2-ethyl-thiophosphoric) acid, the overall extractant concentration was a constant equal to 1 and the aqueous solution was 0.05M nitric acid;

FIG. 2 is a diagram depicting the variations of the distribution coefficients $D_{Am}$ of americium (III) and $D_{Eu}$ (III) (curves I and II, respectively), with respect to the pH of the starting aqueous solution; the solvent used was constituted by 0.75M di-2-ethyl-hexyl-dithiophosphoric acid and 0.25M tributyl phosphate, in solution in dodecane; the concentration of the $NO_3^-$ ions in aqueous phase was maintained constant and equal to 1M;

FIG. 3 is a diagram depicting the variations of the distribution coefficients $D_{Am}$ of americium (III) and $D_{Eu}$ of europium (III) (curves I and II, respectively), with respect to the concentration of the organic solvent in di-2-ethyl-hexyl-dithiophosphoric acid; the concentration of tributyl-phosphate was maintained constant and equal to 0.1M and the aqueous phase was 0.05N nitric acid; and FIG. 4 is a diagram depicting the variations of the distribution coefficients $D_{Am}$ of americium (III) and $D_{Eu}$ of europium (III) (curves I and II, respectively), with respect to the concentration of the aqueous solution in nitric acid. The organic phase was constituted by a mixture of 0.75M di-2-ethyl-hexyl-dithiophosphoric acid and 0.25M trioctylphosphine oxide in solution in dodecane. The aqueous phase contained $NO_3^-$ ions of constant concentration originating either from the nitric acid of from potassium nitrate.

In each of the above experiments, the diluting agent used was dodecane and the distribution coefficients of americium and europium were determined through $\gamma$ spectrometry. Americium 241 was present at concentrations in the vicinity of $10^{-5}M.1^{-1}$; europium at concentrations of $2.10^{-2}M.1^{-1}$ with $1mCi.1^{-1}$ of the radioactive mixture $152_{Eu}$-$154_{Eu}$.

It should be specified that the distribution coefficient is equal to the ratio of the concentration of an element in the organic-phase to the concentration of the same element in the aqueous phase.

These results show that the way the ions are extracted is not the same for the Am (III) ions and for the Eu (III) ions. The curves of FIGS. 1 to 4 suggest that the extraction processes correspond to the following reactions.

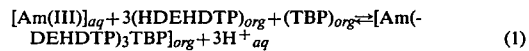

$$[Am(III)]_{aq} + 3(HDEHDTP)_{org} + (TBP)_{org} \rightleftharpoons [Am(DEHDTP)_3 TBP]_{org} + 3H^+_{aq} \quad (1)$$

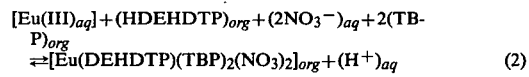

$$[Eu(III)_{aq}] + (HDEHDTP)_{org} + (2NO_3^-)_{aq} + 2(TBP)_{org}$$
$$\rightleftharpoons [Eu(DEHDTP)(TBP)_2(NO_3)_2]_{org} + (H^+)_{aq} \quad (2)$$

Indeed, from the results indicated in FIGS. 2 and 3 in which the slopes of curves (I) and (II) are 3 and 1, respectively, it can be easily understood that three H+ ions and three (DEHDTP)- ions are exchanged during the extraction of americium, whereas only one H+ ion and one (DEHDTP)- ion are exchanged during the extraction of europium.

EXAMPLE 1

This example relates to the separation of americium III from europium III by means of an organic solvent comprising a mixture of tributyl phosphate and di-2-ethyl-hexyl-dithiophosphoric acid in dodecane, the overall concentration in extractants of the organic system being equal to 1M and the concentration of aqueous solution in nitric acid being 0.05M.

It is possible to carry out the separation of americium from europium through a counter-current extraction in an apparatus comprising 6 extraction stages and 3 washing stages, the flow-rate ratio of the oranic phases to the aqueous phase being 0.25 in the extraction part and 0.5 in the washing part. Under such conditions, a recovery of about b 99.5% of the starting americium is obtained and the thus-recovered americium contains about 0.4% of the starting europium.

FIG. 1 in which are illustrated the variations of the distribution coefficients $D_{Am}$ and $D_{Eu}$ (curves I and II, respectively), with respect to the content of the solvent in di-2-ethyl-hexyl-dithiophosphoric acid expressed as a molar percentage of the mixture of extractants, shows that this example is not limitative as regards the chemical conditions.

It can be seen from that figure that the best result is obtained when the mixture of extractants comprises 75% of HDEHDTP and 25% of TBP. On the other hand, it can be noted that satisfactory results are obtained when the molar ratio of di-(2-ethyl-hexyl)-dithiophosphoric acid to tributyl phosphate is from about ⅔ to 9/1.

The extraction apparatus and its operating conditions should be so selected so as to conform to the distribution coefficients of americium and europium, according to the usual rules of chemical engeenering.

EXAMPLE 2

In this example the solvent used was 0.75M di-(2-ethyl-hexyl)-dithiophosphoric acid and 0.25M trioctyl phosphine oxide. It is thus possible to carry out the separations operations at higher acidities than those suggested at example 1. For instance, it is possible to carry out the separation of americium from europium in a 0.3N nitric acid medium, by means of a battery of mixer-decanters. Six extraction stages and three washing stages were used. The flow rate ratio of the organic phase to the aqueous phase was 0.25 in the extraction stage and 0.25 is the washing stage. 99.5% of the starting americium was recovered in the organic phase. The thus-recovered americium contained europium in amounts lower than 0.1% of the starting europium.

As example 1, the above conditions are by no means limitative, as shown by the distribution coefficients of americium and europium in FIG. 4. It can be noted that the americium-europium separation coefficients can be greater than those of FIG. 4 for the same acidity, in potassium nitrate is eliminated. Indeed, equations (1) and (2) of extraction equilibria show that the presence of $NO_3^-$ ions promotes the extraction of Eu (III) ions exclusively. Other operating conditions for the counter-current separation can be resorted to.

EXAMPLE 3

This example relates to the separation of americium III, from cerium III and from europium III present in a solution of 0.05N nitric acid by means of an organic solvent constituted by dodecane containing 0.25M of tributylphosphate and 0.75M of di-2-ethyl-hexyl-dithiophosphoric acid. The separation was carried out in a battery of mixer-decanters comprising six extraction stages, with a volume ratio of the organic phase to the aqueous phase equal to 0.25 and six washing stages with a ratio of the organic phase to the aqueous phase equal to 0.5. Under such conditions, an organic phase was obtained containing 99.5% of americium and 0.4% of the starting lanthanides.

The distribution coefficients were 4.1 for americium, 0.23 for cerium III and 0.17 for europium III, respectively.

While the above examples describe the application of the method according to the invention to the americium/europium separation or Am/Ce-Eu separation constituting pairs of elements of the actinide and lanthanide groups the most difficult to separate, however the method according to the present invention can also be applied to the separation of other elements belonging to the actinide and lanthanide groups.

What is claimed is:

1. A method for the separation of actinides from lanthanides present in a trivalent state in an acidic aqueous solution, said method consisting in selectively extracting in an organic solvent the actinides present in said solution, by bringing said aqueous solution into contact with an organic solvent comprising a system of extractants constituted by a dialkyl dithiophosphoric acid and by a neutral organo-phosphorated compound containing at least one electron-doner oxygen atom selected from the group consisting of tributyl phosphate and phosphine oxides having the formula:

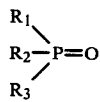

in which radicals $R_1$, $R_2$ and $R_3$, either identical or different, represent an alkyl radical, an alkoxyalkyl radical or an aryl radical.

2. A method according to claim 1, wherein said dialkyl dithiophosphoric acid is di-2-ethylhexyldithiophosphoric acid.

3. A method according to claim 1, wherein said phosphine oxide is trioctylphosphine oxide.

4. A method according to claim 1, wherein said phosphine oxide is di-n-hexyl-octyloxymethylphosphine oxide.

5. A method according to any of claims 1 to 4, wherein the concentrations of said extractants in said organic solvent are such that the molar ratio of the dialkyl dithiophosphoric acid to the neutral organo-phosphorated compound with at least one electron doner oxygen atom is from about 2:3 to about 9:1.

* * * * *